(12) United States Patent
Norton et al.

(10) Patent No.: US 7,242,572 B2
(45) Date of Patent: Jul. 10, 2007

(54) METHODS OF APPLYING SEPARATOR MEMBERS TO AN ELECTRODE OF A CAPACITOR

(75) Inventors: John D. Norton, Minneapolis, MN (US); Anthony W. Rorvick, Champlin, MN (US); Mark D. Breyen, Plymouth, MN (US); Paul A. Pignato, Stacy, MN (US); Thomas P. Miltich, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 272 days.

(21) Appl. No.: 10/618,048

(22) Filed: Jul. 11, 2003

(65) Prior Publication Data

US 2005/0117277 A1    Jun. 2, 2005

Related U.S. Application Data

(60) Provisional application No. 60/474,800, filed on May 30, 2003.

(51) Int. Cl.
*H01G 9/00* (2006.01)
(52) U.S. Cl. ............... 361/502; 361/503; 361/504; 361/508; 361/512
(58) Field of Classification Search ........ 361/508–512, 361/502–504, 523–525, 528–534; 429/94
See application file for complete search history.

(56) References Cited

U.S. PATENT DOCUMENTS

| | | | |
|---|---|---|---|
| 3,555,369 A | 1/1971 | Yoshino | |
| 3,661,645 A | 5/1972 | Strier et al. | |
| 3,883,784 A | 5/1975 | Peck et al. | |
| 4,470,097 A | 9/1984 | Lavene | |
| 4,480,290 A | 10/1984 | Costanti et al. | |
| 4,593,343 A | 6/1986 | Ross | |
| 4,633,373 A | 12/1986 | Phillips | |
| 4,830,940 A | 5/1989 | Keister et al. | |
| 4,876,451 A | 10/1989 | Ikeda et al. | |
| 5,131,388 A | 7/1992 | Pless et al. | |
| 5,157,586 A | 10/1992 | Lallemand | |
| 5,415,959 A | 5/1995 | Pyszcek et al. | |
| 5,439,760 A * | 8/1995 | Howard et al. | 429/94 |
| 5,486,215 A | 1/1996 | Kelm et al. | |
| 5,614,111 A | 3/1997 | Lavene | |
| 5,850,331 A * | 12/1998 | Matsumoto et al. | 361/502 |
| 5,926,362 A | 7/1999 | Muffoletto et al. | |
| 6,006,133 A | 12/1999 | Lessar et al. | |
| 6,048,607 A | 4/2000 | Hashimoto et al. | |
| 6,056,006 A | 5/2000 | Yoshioka et al. | |

(Continued)

*Primary Examiner*—Nguyen T. Ha
(74) *Attorney, Agent, or Firm*—Paul H. McDowall; Girma Wolde-Michael (57) ABSTRACT

A sealed electrode enclosed in separator material is provided for use in a capacitor cell. The separator may either be adhered to the electrode in sheets, or may be formed into a pouch, which is used to enclose the electrode. A method of preparing the electrode sealed with separator is described in which an adhesive is used to secure the pouch to the electrode before sealing it. The prefabricated electrode and separator combination may be used in both coiled capacitor cells and flat capacitor cells that are often used in implantable medical devices. Electrodes prepared in this fashion can be efficiently and reliably aligned within the case of a capacitor cell, and have no exposed electrode surfaces that could lead to short-circuiting within the cell.

10 Claims, 4 Drawing Sheets

U.S. PATENT DOCUMENTS

| | | |
|---|---|---|
| 6,127,042 A | 10/2000 | Tarnic |
| 6,208,502 B1 * | 3/2001 | Hudis et al. ................ 361/503 |
| 6,231,993 B1 | 5/2001 | Stephenson et al. |
| 6,275,729 B1 | 8/2001 | O'Phelan et al. |
| 6,423,863 B1 | 7/2002 | Pressman |
| 6,432,572 B1 * | 8/2002 | Yoshida et al. ................ 429/56 |
| 6,508,901 B2 | 1/2003 | Miller et al. |
| 6,699,265 B1 * | 3/2004 | O'Phelan et al. ............... 607/1 |
| 6,818,517 B1 * | 11/2004 | Maes ......................... 438/287 |

* cited by examiner

METHODS OF APPLYING SEPARATOR MEMBERS TO AN ELECTRODE OF A CAPACITOR

CROSS REFERENCE TO RELATED APPLICATION

This patent disclosure claims the benefit of prior provisional U.S. patent application Ser. No. 60/474,800, invented by Norton et al., filed 30 May 2003, and entitled, "Electrochemical Cells Including Enhanced Separator Systems and Materials"—the contents of which are fully incorporated herein.

FIELD OF THE INVENTION

The present invention relates generally to apparatus and corresponding fabrication methods involving separator material adhered to at least a portion of one electrode for an electrolytic capacitor cell; and, more particularly, apparatus and corresponding methods involving disposing, sealing and optionally adhering the electrode within a pouch or envelope of separator material.

DESCRIPTION OF THE RELATED ART

An electrolytic capacitor cell typically comprises an anode coated with dielectric, a separator, a cathode, and an electrolyte solution. The anode and cathode typically comprise a stack or cylindrical roll of formed foils or a pressed, sintered and formed powder metal anode and opposing cathode member. Prior art capacitors having stacked sheet- or coiled-electrodes are oftentimes etched and/or perforated to increase the surface area of the electrodes, as the energy stored by the capacitor cell is proportional to the surface area of the anode. A dielectric oxide layer is formed on the anode when a voltage is applied to the anode in a formation electrolyte solution. The dielectric layer insulates the anode from the cathodic electrolytic solution, allowing charge to accumulate. The separator spaces the anode and cathode foils apart to maintain charge and prevent short-circuits therebetween. The anode/separator/cathode laminate is typically rolled up to form a cylindrical body and encased, with the aid of suitable insulation, in a canister that is subsequently sealed, for example, with a rubber material.

Compact flat electrolytic capacitor (FEC) cells, typically using aluminum foil for the anode and cathode, are an alternative design commonly used in implantable cardioverter-defibrillators (ICDs). An FEC cell was viewed as superior in regard to some of the disadvantages inherent in commercially available cylindrical capacitor cells. For example, U.S. Pat. No. 5,131,388 to Pless et. al. discloses a relatively volumetrically efficient flat capacitor cell having a plurality of planar layers arranged in a stack. Each layer contains an anode layer, a cathode layer and means for separating the anode layers and cathode layers (such as paper). The anode layers and the cathode layers are electrically connected in parallel. In a paper entitled, "High Energy Density Capacitor cells for Implantable Defibrillators," presented at CARTS 96: 16th Capacitor cell and Resistor Technology Symposium, Mar. 11–15, 1996, several improvements in the design of flat aluminum electrolytic capacitor cells were described, such as the use of an embedded anode layer tab and solid adhesive electrolyte. Further advances in flat electrolytic capacitor cells are found in U.S. Pat. No. 6,006,133, issued to Lessar et al., the disclosure of which is incorporated herein by reference.

For either flat or cylindrical capacitor cells, the anode and cathode must remain separated for the capacitor cell to function. Separation between the anode and cathode must be maintained to prevent arcing between the anode and cathode, and to allow charge to accumulate without short-circuiting. In cylindrical capacitor cells, the anode and cathode are aligned precisely and coiled tightly to prevent movement of the anode, cathode and separator during subsequent processing and use. Spacing is typically maintained at the electrode edges as well by providing separator overhang at the top and bottom of the anode and cathode winding, to prevent short-circuiting to the casing.

Maintaining the proper distance between the components of a capacitor cell is thus one of the prime functions of a separator. However, a separator must also have numerous other attributes to be useful in a capacitor cell. A separator must be resistant to degradation, have sufficient thickness to maintain inter-electrode separation without interfering with cell high performance, and exhibit sufficient surface energy such that electrolyte wetability and absorption are augmented. The separator material must also have an electrical resistivity sufficiently high to prohibit short circuit current from flowing directly through the separator. The tortuosity of the separator material also impacts electrical performance of the capacitor. These requirements are balanced by the need for the separator to have porosity sufficient to allow ionic transfer to occur essentially unimpeded within the electrolyte during charge and discharge. Additionally, the separator must have sufficiently strong tensile properties to facilitate cell fabrication and to withstand internal cell stresses due to changes in electrode volume during charge and discharge cycles.

A variety of separator materials have been found to be effective. Paper, particularly Kraft paper, is a cellulose-based separator material that is commonly used. The total thickness of cellulose separators employed between anode and cathode plates will vary with the voltage rating of the capacitor cell structure and the type of electrolyte employed but, on the average, the thickness varies from 0.003' to 0.008' in connection with capacitor cells rated at from 6 volts to 600 volts, respectively. Metallized paper and paper & foil constructions are useful variants of cellulose-based separators. Separators are generally made from a roll or sheet of separator material.

Polymeric separators are a common alternative to paper separators. Generally, polymeric separators are either made of microporous films or polymeric fabric. An example of a microporous film separator is a separator comprising polytetrafluoroethylene, disclosed in U.S. Pat. No. 3,661,645 to Strier et al. U.S. Pat. No. 5,415,959 to Pyszeczek et al., on the other hand, describes the use of woven synthetic halogenated polymers as capacitor cell separators. The use of "hybrid" separators comprising polymer and paper material has also been described. See, for example, U.S. Pat. No. 4,480,290 to Constanti et al. that describes the use of separators including a porous polymer film made from polypropylene or polyester and absorbent paper.

When assembling a capacitor cell, it is important to maintain contact and alignment of the anode, cathode, and separator components. This has required the introduction of additional components and/or manufacturing steps that would otherwise not be necessary. For example, in cylindrical capacitor cells, proper spacing is typically maintained at the electrode edges by providing separator overhang at the top and bottom of the anode and cathode winding, resulting in a larger capacitor cell than would otherwise be necessary. A winding machine is also generally required for cylindrical capacitor cells to assure that the anode and cathode are precisely aligned and coiled tightly by to prevent their movement during subsequent processing and use. Flat capacitor cells, on the other hand, may require the inclusion of internal alignment posts to maintain anode to cathode alignment. Build-up of static charge in the separator material during manufacture of the capacitor cell can make handling of the material particularly troublesome, increasing the likelihood of construction defects. All of these techniques for maintaining proper alignment of the components of a capacitor cell have disadvantages that increase expense or decrease performance of capacitor cells.

It would thus be desirable to find a means to reliably and efficiently attach separator material to the electrodes of an electrolytic capacitor cell in a manner that would reduce production costs and decrease the likelihood of capacitor cell malfunction.

SUMMARY OF THE INVENTION

The present invention relates to a variety of means of adhering separator material to capacitor cell electrodes. In particular, the invention comprises means of wrapping and adhering a discrete sheet portion, a pouch or an envelope of separator material around at least a portion of one capacitor cell electrode. By wrapping and adhering separator material around a portion of a capacitor cell electrode, substantial increases in capacitor cell manufacturability and reliability are obtained without decreasing electrical charge/discharge performance. Capacitor cell separators are known to have substantial impact on capacitor cell manufacturability. During capacitor cell assembly, the accumulation of static electricity by the separator and air currents can cause significant problems. Also, maintaining capacitor cell alignment while the anode and cathode elements are paired or stacked can be very difficult. By wrapping and adhering separator material to a portion of an electrode of a capacitor cell electrode prior to assembly (e.g., combination of at least two electrodes) of the capacitor cell, these alignment problems are eliminated and manufacturability is substantially improved.

The present invention also substantially improves capacitor cell reliability. A frequent failure mode for capacitor cells is the shorting or arcing between the electrodes which oftentimes results from misalignment or manufacturing defects generated during fabrication. The ability to adhere and wrap separator material around at least a portion of one of a plurality of capacitor cell anodes and/or cathodes, results in a completely or partially sealed electrode assembly, improves the ability of the separator to prevent shorting or arcing between electrodes and/or the capacitor cell case.

In addition, the present invention provides a method of sealing separator material around an electrode, comprising the steps of providing an electrode comprising a one or more anode or cathode suitable for use in an electrolytic capacitor cell; forming a pouch of separator material to enclose the electrode; adhering the pouch of separator material to the electrode; and sealing the pouch of separator material around the electrode. The pouch of separator material may comprise one or more layers of Kraft paper, or it may comprises one or more layers of dielectric polymer film. Three preferred dielectric polymer films are polyethyelene, polypropylene, and polytetrafluoroethylene. Methods of adhering the pouch of separator material to the electrode assembly include stitching, adhesive bonding, taping, solvent welding, ultrasonic paper welding and the like. The pouch of separator material itself may be formed by pressure forming, thermoforming, solvent casting and the like. The electrodes used in this method generally include one or more tabs that project from the pouch of separator material. The pouch of separator material may be sealed around the electrode using heat sealing techniques.

The present invention also relates to a preformed separator and electrode combination for use in a capacitor cell, comprising one or more electrodes; one or more tabs connected to the one or more electrodes; and a pouch of separator material enclosing the electrode assembly, wherein the one or more of the electrode tabs project from the pouch of separator material. The one or more electrodes generally comprise one or more cathodes or anodes. The pouch of separator material may comprise one or more layers of Kraft paper, or it may comprises one or more layers of dielectric polymer. Polyethyelene, polypropylene, or polytetrafluoroethylene are preferred dielectric polymers. In one embodiment, an adhesive couples a pouch or sheet of separator material to a part of an electrode assembly. In preferred embodiments, the electrodes may be configured for use in a powdered metal capacitor cell, a flat capacitor cell, or a coiled capacitor cell.

One embodiment of the present invention relates to a substantially flat electrode assembly suitable for use in a capacitor cell, comprising at least one flat cathode layer having no holes for registration disposed therethrough, the cathode layer being formed of cathode foil and having a first perimeter of a first overall length, the cathode layer having at least a first tab projecting from the first perimeter at a first predetermined perimeter location; a plurality of flat anode layers formed of anode foil having no holes for registration disposed therethrough, the plurality of anode layers forming an anode sub-assembly, at least one of the plurality of anode layers being a first anode layer having a second perimeter of a second length and at least a second tab projecting from the second perimeter at a second predetermined perimeter location; and at least one separator envelope comprising upper and lower surfaces formed of separator material, the upper and lower surfaces of the separator envelope having third perimeter of a third length; wherein at least one of the cathode layer and the plurality of anode layers are vertically stacked between the upper and lower surfaces of the at least one separator envelope such that at least one surface of separator material is disposed between the at least one cathode layer and the anode subassembly, the lengths of the first and second perimeters each being less than the respective lengths of the third perimeter, the one or more tabs projecting from beyond the cathode and anode layer perimeters to provide contact with the capacitor cell.

In one embodiment of the substantially flat electrode assembly, the cathode layer is formed from aluminum anode foil and the anode layer from a through-etched aluminum anode foil. Preferably each anode layer has a specific capacitance selected from the group consisting of at least about 0.3 microfarads/cm$^2$, at least about 0.5 microfarads/cm$^2$, at least about 0.8 microfarads/cm$^2$ and at least about 1 microfarads/cm$^2$. Each anode layer also preferably has a thickness selected from the group consisting of from about 20 micrometers to about 300 micrometers, from about 40 micrometers to about 200 micrometers, from about 60 micrometers to about 150 micrometers, and from about 70 micrometers to about 140 micrometers.

In one embodiment of the present invention, the cathode layer is formed from a highly etched cathode foil. The cathode layer may be formed from a aluminum cathode foil having a specific capacitance selected from the group consisting of at least about 100 microfarads/cm$^2$, at least about 200 microfarads/cm$^2$, at least about 250 microfarads/cm$^2$, and at least about 300 microfarads/cm$^2$. The cathode layer may also be formed from aluminum foil having a thickness selected from the group consisting of from about 10 micrometers to about 200 micrometers, from about 15 micrometers to about 150 micrometers, from about 20 micrometers to about 100 micrometers, from about 25 micrometers to about 75 micrometers, and about 30 micrometers.

In the flat electrode assembly described above, the anode sub-assembly may comprise a plurality of non-notched anode layers and at least one notched anode layer. In a further embodiment, the anode layers in the anode sub-assembly are cold welded together.

BRIEF DESCRIPTION OF THE DRAWINGS

The above and other objects and aspects of the invention will be apparent from the description of embodiments illustrated by the following accompanying drawings.

DETAILED DESCRIPTION OF SPECIFIC EMBODIMENTS

Figure 1:
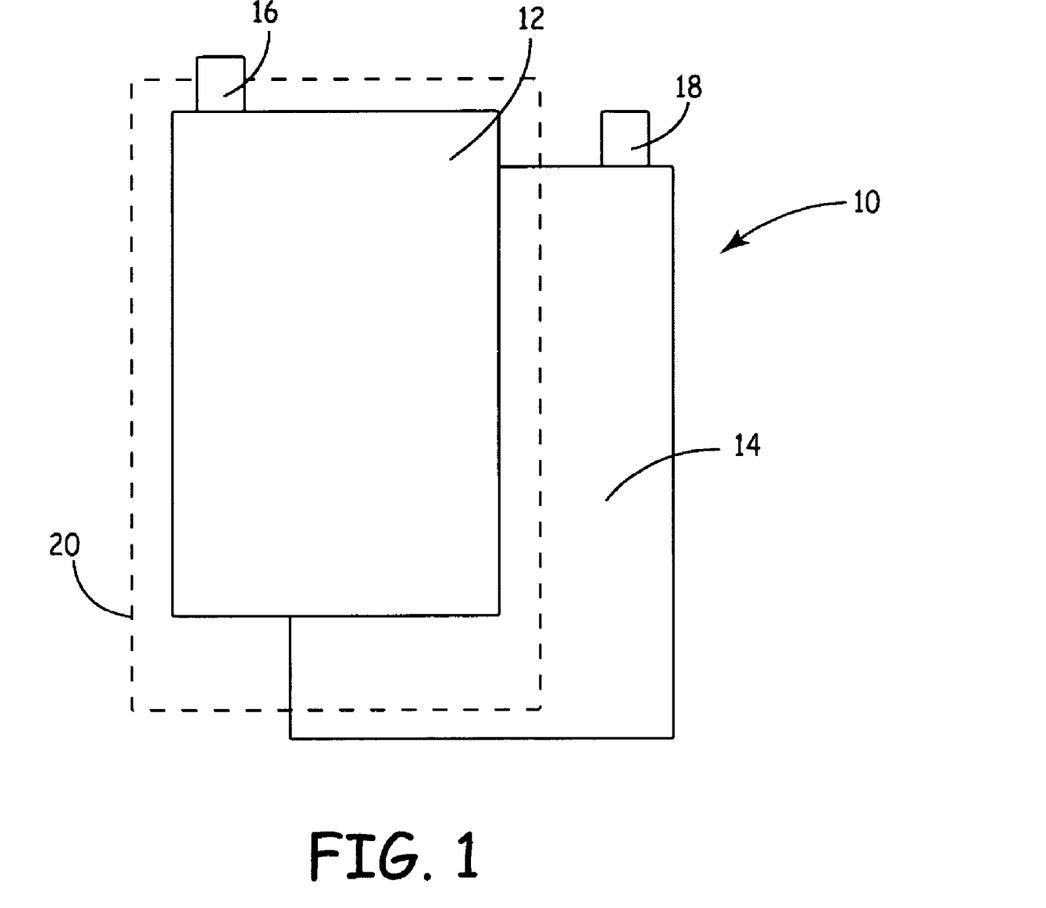
FIG. 1 depicts a perspective view of a simple flat capacitor cell in which one of the electrodes has been sealed in separator material.

FIG. 1 shows an exploded perspective view of a simple flat capacitor cell 10 in which one of the electrodes has been sealed in separator material. The capacitor cell 10 comprises an anode 12 and a cathode 14, which are provided with an anode tab 16 and a cathode tab 18, respectively. The anode 12 of the capacitor cell is encased in a separator pouch 20 (shown in ghost). The separator pouch 20 extends beyond the edge of the capacitor cell and covers both sides of the electrode such that the electrode is completely enclosed in separator material. While FIG. 1 shows the anode 12 enclosed in the separator pouch 20, the separator pouch 20 can also be used to enclose the cathode 14. Alternately, both the anode 12 and the cathode 14 can be enclosed in a separator pouch 20. The anode tab 16 and the cathode tab 18 pass through the separator pouch 20. Furthermore, an adhesive material may be applied to adhesively couple the separator pouch 20 to a portion of either the anode 12 or the cathode 14. Such adhesive material may be disposed on an exterior portion of the separator pouch 20 to adhere the pouch 20 to an opposing electrode of the capacitor cell 10. Alternatively, such adhesive material may be applied to an enveloped electrode or to both an enveloped electrode and an opposing non-enveloped electrode.

Figure 2:
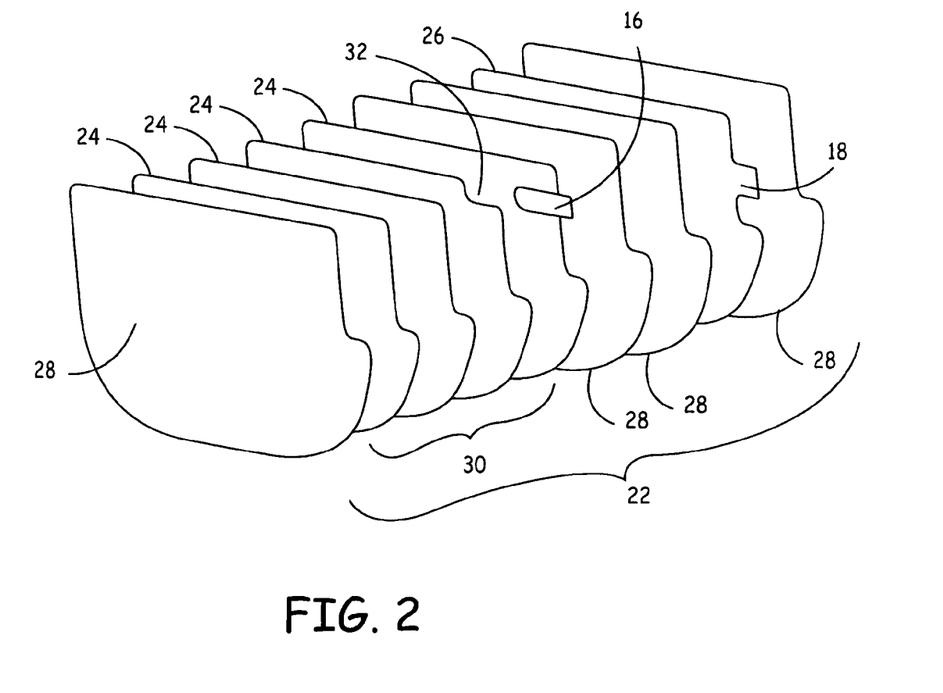
FIG. 2 depicts a plan view of an embodiment of a capacitor cell assembly formed in a flat construction.

FIG. 2 shows an exploded perspective view of a flat electrolytic capacitor (FEC) cell assembly 22 that provides for a compact FEC having opposing substantially flat sides according to an embodiment of the present invention. The capacitor cell assembly illustrated in FIG. 2 employs a stacked configuration, where the anode/cathode assembly comprises alternating substantially rectangular-shaped anode layers 24 and cathode layers 26. In one embodiment of the present invention, individual separator layers 28 are disposed between anode sub-assembly 30, which comprises several adjacent anode layers, and cathode layer 26, and are adhered to at least a portion of one of the adjacent electrodes before or during assembly. In an alternate embodiment, a separator pouch 20 wraps around the electrodes. One anode layer 24 has an anode tab 16 attached thereto, while the cathode layer 26 preferably has cathode tab 18 formed integral thereto and projecting from the periphery thereof.

The shapes of anode and cathode layers are primarily a matter of design choice, and are dictated largely by the shape or configuration of case within which those layers are ultimately disposed. The anode and cathode layers shown in the capacitor cell assembly 22 shown in FIG. 2 are designed primarily for use in implantable medical devices, as disclosed in commonly owned U.S. Pat. No. 6,006,133 to Lessar et al, which is hereby incorporated by reference. The '133 patent also discloses a die apparatus that may be employed to produce layers having a desired predetermined shape, such as those shown in FIG. 2. An advantage of the capacitor cell construction by this method is that the anode and cathode layers and their associated separator material may assume any arbitrary shape in order to optimize packaging efficiency. While the anode and cathode layers may be prepared with registration holes to assist with alignment within the case of the capacitor cell, it is preferred to prepare the electrodes without registration holes as the use of separator material adhered to an opposing electrode, as disclosed in the present disclosure, obviates the need for this method of mechanical alignment.

The anode and cathode layers are preferably formed of materials typically used in high quality aluminum electrolytic capacitor cells. Individual anode layers 24 are typically somewhat stiff and formed of high-purity aluminum processed by etching to achieve high capacitance per unit area. Cathode layers 26 are preferably high purity and are comparatively flexible. Separators are preferably constructed as a pouch or envelope that can enclose the electrodes. Alternately, the separators 28 can be adhered to the surface of the electrodes. When separators 28 are provided in the form of cut sheets, they should be made at least slightly larger than cathode and anode layers to ensure that a physical barrier is disposed between the edges of the anodes and cathodes in the finished capacitor cell.

The embodiment of capacitor cell assembly shown in FIG. 2 is but one of a plurality of anode/cathode assemblies disposed within a capacitor cell. Likewise, a plurality of anode layers and separator layers are preferably disposed within each assembly, while a single cathode layer is disposed within each assembly. Anode sub-assembly 30 in FIG. 2 is furthermore but one embodiment of anode sub-assembly 30 of the present invention, and is shown therein as most preferably comprising three un-notched and one notched anode layers 24 and one anode tab 16. In a pressed, sintered and formed powdered metal capacitor cell, such as those having a single tantalum anode and an appropriate cathode the embodiments just described and depicted can be readily applied to great advantage. That is, a flat portion of separator material may be adhered to either (or both) the anode and the cathode or disposed within and optionally adhered to a pouch of separator material. With respect to adhering an electrode to the pouch, one or more discrete droplets of adhesive may be used and preferably compressed so that the overall volume of the capacitor cell is not increased and with an appropriate amount of adhesive so as not to degrade ionic transport in and through the anode.

It will be understood by those skilled in the art that the type of cell desired for a given application and the precise number of anode/cathode assemblies 22 selected for use in a given capacitor cell will depend upon the energy density, volume, voltage, current, charge/discharge requirements, desired energy output and other requirements of the device. Similarly, it will be understood by those skilled in the art that the precise number of notched and un-notched anode layers 24, anode tabs 16, anode sub-assemblies 30, and cathode layers 26 selected for use in a given embodiment of anode/cathode assembly will depend upon the energy density, volume, voltage, current, energy output and other requirements placed upon the capacitor cell. It is thus apparent that a virtually unlimited number of combinations and permutations respecting the number of anode/cathode assemblies, and the number of unnotched and notched anode layers 24 forming the anode sub-assembly 30, the number of anode sub-assemblies 30, anode tabs 16, and cathode layers 26 disposed within each anode/cathode assembly 22, may be selected according to the particular requirements of capacitor cell, and further that such combinations and permutations fall within the scope of the present invention. A variety of separator materials and configurations are also within the scope of the present invention, as will be described in more detail below.

FIG. 2 illustrates an anode sub-assembly that comprises a plurality of non-notched and notched anode layers 24, anode tab 16 and anode tab notch 32. As depicted in FIG. 2, anode layers 24 are formed of an anode foil. While not central to the concepts embodied in the present invention, an exemplary anode foil useful for FEC-type capacitor cells preferably may: be through-etched, have a high specific capacitance (at least about 0.3, at least about 0.5 or most preferably at least about 0.8 microfarads/cm$^2$), have a dielectric withstand parameter of at least 425 volts DC, a thickness ranging between about 50 and about 200 micrometers, and a cleanliness of about 1.0 mg/m$^2$ respecting projected area maximum chloride contamination. Of course, as appreciated by those of skill in the art, according to the present invention a single anode member 24 opposing and spaced from a cathodic material disposed on a substrate has a sheet of separator material adhered to at least a portion of either the anode member or the cathodic material. The separator material may be configured to fully surround either the anode member or the cathodic material (or the substrate therefor). In each embodiment of the present invention having a electrically conducting housing for the cell, a discrete amount of adhesive may be distributed on or between the separator and an adjacent portion of said housing. The resulting capacitor cell provides superior post-fabrication alignment of all components therein with an added benefit of reduced shifting or migration of the separator(s) disposed therein. Also, prior the ultimate assembly of the cell, a prepackaged electrode-separator assembly add manufacturing efficiency as a direct result of the techniques and apparatus provided by some embodiments of the present invention. In particular, in one embodiment for fabricating a capacitor having a single, fully formed anode member adhered within a pouch or envelope of separator material, the final assembly comprises disposing said assembly into a capacitor cell housing member, electrically coupling the anode to a hermetic feed-through, sealing the housing and filling same with working electrolyte (and finally sealing a fill port typically used to top-off said working electrolyte). If the cathodic material is pre-fabricated into or onto an interior portion of the housing or a carbonaceous layer coupled to said housing, the final assembly may omit fabrication steps dedicated to the cathode for the capacitor cell.

In one embodiment of the present invention, the anode foil has a rated surge voltage of 390 volts, an initial purity of about 99.99% aluminum, a final thickness of about 104 micrometers, plus or minus about five micrometers, and a specific capacitance of about 0.8 microfarads per square centimeter. The anode foil may also be formed of other materials or metals in addition to aluminum, aluminum alloys and "pure" aluminum. Suitable anode foils for practicing the present invention are commercially available on a widespread basis.

A cathode member is preferably disposed within the capacitor cell closely spaced from the anode member (or members). Preferred cathodes comprise cathode foils having high surface area (i.e., highly etched cathode foil), high specific capacitance (preferably at least 200 microfarads/cm$^2$, and at least 250 microfarads/cm$^2$ when fresh), a thickness of about 30 micrometers, a cleanliness of about 1.0 mg/m$^2$ respecting projected area maximum chloride contamination, and a purity which may be less than that of the corresponding starting foil material from which the anode foil is made.

In one embodiment of the present invention, the cathode foil has an initial purity of at least 99% aluminum, a final thickness of about 30 micrometers, and an initial specific capacitance of about 250 microfarads per square centimeter. The cathode foil also preferably has a specific capacitance ranging between about 100 and about 500 microfarads/cm$^2$, about 200 and about 400 microfarads/cm$^2$, or about 250 and about 350 microfarads/cm$^2$, a thickness ranging between about 10 and about 150 micrometers, about 15 and about 100 micrometers, about 20 and about 50 micrometers, or about 25 and about 40 micrometers.

It is generally preferred that the specific capacitance of the cathode foil be as high as possible, and that cathode layer be as thin as possible. For example, it is contemplated in the present invention that individual cathode layers have specific capacitances of about 100 microfarads/cm$^2$, about 200 microfarads/cm$^2$, about 300 microfarads/cm$^2$, about 400 microfarads/cm$^2$, about 500 microfarads/cm$^2$, about 600 microfarads/cm$^2$, about 700 microfarads/cm$^2$, about 800 microfarads/cm$^2$, about 900 microfarads/cm$^2$, or about 1,000 microfarads/cm$^2$. Suitable cathode foils for practicing the present invention are commercially available on a widespread basis. The cathode foil may also be formed of other materials or metals in addition to aluminum, aluminum alloys and "pure" aluminum.

Figure 3:
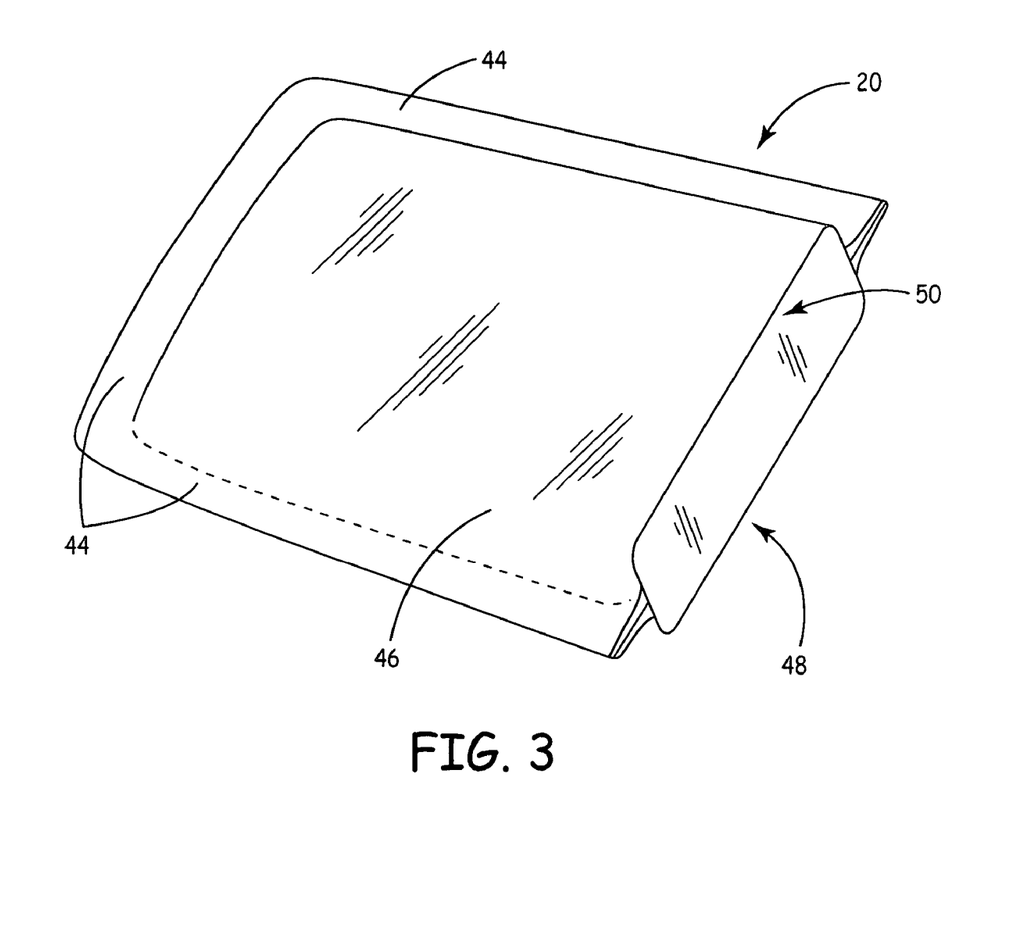
FIG. 3 depicts a cross-sectional view of an embodiment of the pouch of the present invention.

FIG. 3 shows separator material formed into a pouch for use in a preferred embodiment of the present invention. Separator material may alternately be provided in sheets of material die cut as described above for the anode and cathode components. When provided in sheets, separator layers are preferably cut slightly larger than the anode and cathode layers to accommodate misalignment during the stacking of layers and to prevent subsequent shorting between electrodes of opposite polarity. Separator pouches or layers are preferably made from a roll or sheet of separator material. In one embodiment, the separator material is a pure cellulose, very low halide or chloride content Kraft paper having a thickness of about 0.0005 inches, a density of about 1.06 grams/cm$^3$, a dielectric strength of 1,400 AC volts per 0.001 inches thickness, and a low number of conducting paths (about 0.4/ft$^2$ or less).

A separator pouch 20 as shown in FIG. 3 can be prepared by the following steps. First, two (or more) layers of pre-cut separator material are obtained. These layers will comprise an upper pouch layer 46 and a lower pouch layer 48. The lower and upper pouch layer may comprise one or more sheets of separator material, which may differ in composition if composite layers are desired. If adhesive is used for bonding, adhesive should then be placed in the bonding region 44, which runs in a U-shape around the outer edge of the pre-cut separator material. Of course, the bonding region 44 may be of any arbitrary shape and the overlapping upper and lower pouch layers 46,48 may overlap outwardly as depicted in FIG. 3 or may overlap inwardly to form a substantially flat lateral side portion. Once bonded at 44 the layers 45,48 form a hollow cavity 50, suitably shaped to enclose an electrode. A mandrel may optionally be used to assist in defining the pouch shape. The bonding region 44 may extend out from the body of the pouch, as shown in FIG. 3, or the separator material may be overlapped to more directly follow the contours of the hollow cavity 50. The amount of overlap preferably does not contribute to an increase in overall volume of the capacitor cell. While the separator pouch 20 shown in FIG. 3 is basically rectangular in shape, a variety of shapes are contemplated for use in the present invention, and should be shaped such that they closely fit the electrodes being used. The separator pouch 20 may be formed, for example, by pressure forming, thermo-forming, or solvent casting.

It is preferred that separator pouches or layers be formed of a material that: (a) is chemically inert; (b) is chemically compatible with the selected electrolyte; (c) may be impregnated with the electrolyte to produce a low resistance path between adjoining anode and cathode layers, and (d) physically separates adjoining anode and cathode layers. Separator pouches, envelopes, or layers may be formed of materials other than Kraft paper, such as Manila paper, porous polymeric materials or fabric gauze materials. For example, porous polymeric materials such as those disclosed in U.S. Pat. Nos. 3,555,369 and 3,883,784 may be disposed on or around the anode and cathode layers in embodiments of the present invention. A liquid electrolyte generally saturates or wets the separator and is disposed within the case.

In an alternate embodiment, the separator pouch is made of one or more sheets of a heat-fusible synthetic resin such as polyethylene or polypropylene. The film sheet has generally a thickness of 100–200 □m in order to impart satisfactory mechanical or other desirable properties. In order to enclose or cover a portion of at least one of the electrodes, one or more sheets of resin film are placed on at least one side of an electrode and adhered to said electrode. Alternately, a pair of opposing sheets disposed on each side of an electrode are bonded together around at least a majority of the entire periphery thereof by heat-sealing or other suitable techniques.

As mentioned above, films suitable for enclosing the electrodes are those obtained from heat-fusible synthetic resins, for instance polyethylene resin. Examples of polymer substances suitable for use as separators include porous polymers such as porous polyesters (e.g. polyethylene terephthalate, polyethylene terephthalate and polyetheyene isophthalate copolymer, polyhydrocarbonate), polyethylene, polystyrene, polycarbonate, polyamides 6, and microporous polyetetrafluroethyelene. An even larger variety of polymers are suitable if made more electroconductive through incorporation of electroconductive filler such as carbon black, electroconductive fibers, and electroconductive metal powders. Celgard 4560 (a microporous/nonwoven laminate material made by Hoechst Celanese) is a preferred choice. However, especially when a polyethylene film alone is used as the separator envelope, thermal stress in the neighborhood of the heat-sealed portion may cause fine pinholes or cracks to be produced. This problem is avoidable when the heat-sealing procedure is conducted under carefully controlled conditions or by the use of composite separator films.

Composite films obtained by lamination of at least two kinds of film are preferably usable as the film for the separator envelope or layer. Preferable composite films are those in which at least one of the films is excellent in heat stability and solvent resistance and does not suffer from pinholes or cracking when subjected to a heat-sealing operation. Composite film including a polyethylene film and a polypropylene film is excellent in heat stability and solvent resistance. Composite films are generally combined or bonded together by lamination. Composite film should include at least one film which is excellent in heat stability including, for example, a polypropylene film, a polyethyleneterephthalate or polyimide film. When applied as a pouch or envelope, two sheets of the composite film are placed so that the polyethylene films of the respective sheets are facing each other. By this arrangement the polypropylene films, which are excellent in heat stability and solvent resistance, turn outside. When the two sheets are heat sealed, formation of pinholes or cracks in the vicinity of the heat-sealed portion along the periphery of the sheets are prevented due to the heat stability of the polypropylene film laminated.

Aside from the polypropylene film used for lamination with polyethylene film, other polymer films may be used which are excellent in heat stability and solvent resistance and are thus free of formation of pinholes or cracks on application of heat. Such films include polyethyleneterephthalate film, polyimide film, and polytetrafluoroethylene.

When heat sealing is conducted on the polyethylene film, which is readily fusible by application of heat, a heating resistor of simple construction such as a nichrome wire or band is used. On the other hand, the heat-sealing of a rather heat-resistant film such as a polypropylene film is suitably conducted by a method of self-heating of the film itself such as a high frequency heating technique as is well known in the art. In order to sealingly enclose the capacitor cell element while reducing the air remaining in the enclosure to a degree as small as possible, the heat sealing operation should be conducted in vacuo. It is preferred that the separator film be tightly wrapped around the electrode after heat shrinking. A useful method of heat sealing electrodes with separator material is disclosed in U.S. Pat. No. 6,508, 901, to Miller et al., the disclosure of which is hereby incorporated by reference.

When two sheets are thermally sealed to accommodate an operable capacitor cell therein, the electrical leads from the respective electrodes of the capacitor cell element must be accommodated. Such electrical connections may impede the sealing of the film sheets due to differences in heat capacity and heat conductivity between the resin film and the electrical metal lead. To eliminate this problem, a hot melt resin such as a modified polyolefin resin may be applied as a layer to the inner surfaces of the respective film sheets along the entire periphery thereof or partially at the portions by which the electrical leads are bonded to the film sheets through the hot melt resin layers so as to be embedded in the resin layers. Alternate means of sealing the include ultrasonics, solvent bonding, or adhesive bonding.

Returning to the embodiment shown in FIG. 2, a first preferred step in assembling a flat aluminum electrolytic capacitor cell is to cut anode layers 24, anode tabs 16, cathode layers 26 and separator layers 28. Alternately, when separator pouches 20 are used, these pouches must be first assembled and then used to enclose the desired electrodes. The capacitor cell components are preferably cut to shape using dies having low wall-to-wall clearance, where inter-wall spacing between the substantially vertically-oriented corresponding walls of the punch and die is most preferably on the order of about 6 millionths of an inch per side. Larger or smaller inter-wall spacing between the substantially vertically-oriented corresponding walls of the punch and cavity may also be employed in the present invention but are less preferred. Such low clearance results in smooth, burr free edges being formed along the peripheries of anode layers, anode tabs, and cathode layers that have been found to improve the reliable performance of a capacitor cell.

Other methods of cutting or forming anode layers 24, anode tabs 16, cathode layers 26 and separator layers 28 falling within the scope of the present invention include, but are not limited to, steel rule die cutting, laser cutting, water jet cutting, and blade cutting.

When separator material is adhered as a layer rather than as an envelope or pouch, it should be cut or otherwise form separator layer such that its outer periphery conforms closely to that of the corresponding sidewalls of the interior of case. The periphery of separator layer should be disposed within plus or minus 0.009 inches of the corresponding sidewalls of case. Such close conformity between the periphery of separator layer and the corresponding internal sidewalls of case causes the separator layers to advantageously immobilize and firmly secure the electrode assembly within the capacitor case.

In a preferred method of the present invention, foil or separator materials are drawn between the punch and cavity portions of a die having appropriate clearances on a roll. An air or hydraulically actuated press may be employed to actuate the punch or cavity portion of the die. The punch portion of the die is preferably formed of hardened tool steel, or has other suitable wear resistant materials or coatings disposed on the cutting surfaces thereof. When the cavity of the die is aligned vertically, the punch portion of the die may travel either upwards or downwards towards the die cavity during a cutting cycle. In the former case, components are cut and drop downwardly into a container for use in subsequent assembly operations. In the latter case, components are cut and may be presented directly to automated assembly equipment, such as robots equipped with vacuum or other pick-up tooling, for subsequent processing. Low clearance dies of the type described herein may be supplied by Top Tool, Inc. of Minneapolis, Minn.

The anode sub-assembly 30 preferably includes one notched anode layer that facilitates appropriate placement and positioning of anode tab within anode sub-assembly 30. More than one anode layer 24 with a notch 32 may also be included in an anode sub-assembly 30. It is preferred that the remaining anode layers 24 of anode sub-assembly 30 be non-notched anode layers 24. The anode tab 16 is preferably formed of aluminum strip material. When an anode tab 16 is formed of a non-anodized material, cold welding the tab to non-notched anode layers may be accomplished with less force and deflection. The thickness of the anode tab 16 should be about equal to that of notched anode layer 24. If more than one notched anode layer 24 is employed in anode subassembly, a thicker anode tab 16 may be employed. In the case of a pressed, sintered and fully formed powdered metal anode, such as those made by Wilson Greatbatch Technologies, Inc. of Clarence, N.Y., (WGT) in lieu of an anode tab 16 an elongated conductor is typically embedded into the anode slug prior to pressing. Thus, the elongated conductor may protrude from the capacitor cell. U.S. Pat. Nos. 5,926,362 and 6,231,993 assigned to WGT are hereby incorporated herein by reference.

The present invention includes methods for ensuring proper orientation and alignment of separator layers 28, the anode sub-assembly 30, and the cathode layer 26 in the electrode assembly 22 that does not require the use of internal alignment elements within capacitor cell is enveloping or covering one or more of the anode or cathode layers with separator material. In this method of the present invention, one or more separator layers are combined to prepare one or more envelopes, as shown in FIG. 3. Alternately, die cut piece parts are adhered and then folded around either the anode layers, the anode sub-assembly, or the cathode layer. The free edges of the separator are then secured by, for example, doubled-sided transfer tape, adhesive, stitching, solvent welding, ultrasonic paper welding and the like. Use of a preformed separator and electrode combination constructed in this manner secures and aligns the electrode with the appropriate capacitor cell components, including the case. The resulting one or more preformed separator and electrode combination are then presented, as applicable, for stacking in an electrode assembly. The electrode may be snugly enclosed by the separator pouch 20 by tightening the pouch around the electrode before sealing the pouch. Alternately, the separator pouch 20 may be adhered directly to the electrode, or adhered in addition to securing it by tight sealing.

Yet another method of the present invention useful for securing the separator to the anode sub-assembly is through the use of pressure bonding techniques. Using this method, a separator layer 28 or separator pouch 20 is pressed into a surface of an anode layer 12 or cathode layer 14 over a localized region thereof with sufficient force to rigidly affix the separator material to the electrode, but not with such great force that a portion of the underlying electrode is fractured. Other methods of securing all or portions of separator layer 28 or separator pouch 20 to the cathode layer or anode layer include, but are not limited to, stitching, adhesive bonding and ultrasonic paper welding techniques. Water adhesion and static electricity have also been found to be effective in sealing or adhering separator material to or around an electrode.

Figure 5:
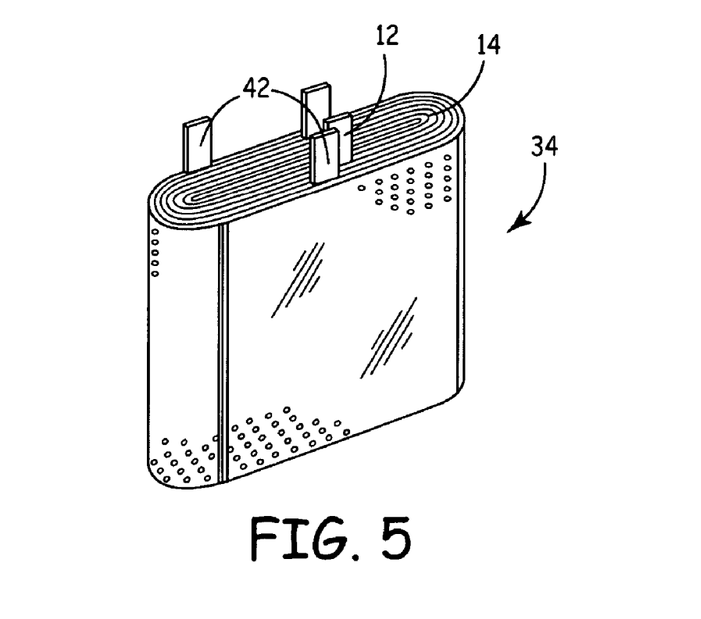
FIG. 5 depicts a perspective view of an electrochemical cell formed using electrode assemblies with separator envelopes.

A coiled capacitor cell 34 in which the electrode elements have separator material either enveloping them or adhered to their surface comprises an alternate embodiment of the present invention, and is shown in FIG. 5. A coiled capacitor cell 34 prepared using one or more preformed separator and electrode combinations can be prepared using methods similar to those used to construct an alkaline battery, as disclosed in commonly assigned U.S. Pat. No. 5,486,215 to Kelm et al., the disclosure of which is hereby incorporated by reference. Of course, the coiled capacitor cell prepared will differ from the lithium battery disclosed in the Kelm patent in it use of differing materials and the technique of using preformed separator and electrode combinations, as described herein.

Figure 4:
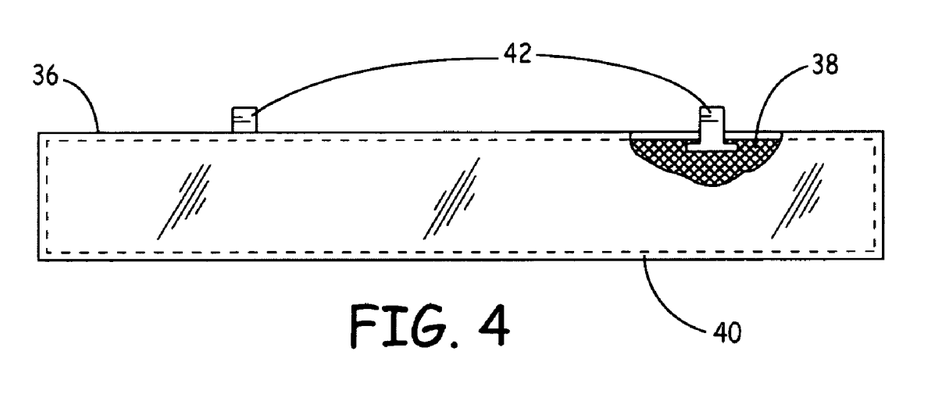
FIG. 4 depicts a partial cut-away side view of a combined electrode assembly and separator.

FIG. 4 shows a preformed separator and electrode combination 36, according to an embodiment of the present invention, wherein a relatively long electrode 38 is used for eventual preparation of a coiled capacitor cell 34. Anode and cathode layers for use as electrodes can be chosen from appropriate materials, known in the art. Separator material forms a separator pouch 40 around the long electrode 38, enclosing the top edge and conforming to the electrode assembly until it reaches the bottom edge where it is joined to itself at a seal. The separator pouch 40 may be prepared before being used to enclose the long electrode 38, or may be prepared "in situ" by forming it around an electrode. Alternately, separator material may be adhered to the sides of the electrodes. Slits can be cut into the separator pouch or envelope to allow the connector tabs 42 to project through the separator pouch 40. The material used for the separator can be the same material described above, such as microporous polyolefins such as polyethylene or polypropylene, with Celgard 4560 (a microporous/nonwoven laminate material made by Hoechst Celanese) being a preferred choice. The separator envelope may be further secured to the underlying electrode by means of pressure bonding or adhesive. The seal for the separator can be a heat seal made by conventional heat sealing equipment. Essentially the same approach can be used for both the anode and cathode layers, although according to the present invention only a single electrode needs to be enveloped with a separator pouch or electrically isolated from the other electrode with an adhesive separator patch.

A wound and coiled electrochemical cell 34 is depicted in FIG. 5. The coiled cell contains both an anode layer 12 and a cathode layer 14, both enclosed in separator material. The double thickness of separator material between the anode and cathode elements resulting from wrapping both electrodes better resists damage during the winding process. Winding proceeds by winding the combined anode and cathode assembly (both with separator material attached) around a mandrel until the capacitor cell is completed. The winding process should be carried out by a method that will result in consistent winding tension. Uneven winding tension can cause higher and lower resistance paths during discharge, producing uneven current distribution and poor placement of connector tabs 42. Even winding tension can be accomplished by careful hand winding or by machine winding. Machine winding produces greater cell-to-cell uniformity and is preferred. The completed assembly, shown in FIG. 5, has connector tabs 42 projecting from the coiled capacitor cell 34. Preferably, the connector tabs 42 associated with the anode are on one side of the capacitor cell. This helps to avoid inadvertent shorts in the completed capacitor cell. A mandrel may be used to assist in assembly of the capacitor cell, and is removed after winding.

Capacitor cells, either flat or coiled, including the anode/separator/cathode assemblies, are typically sealed within an enclosure. The enclosure is preferably comprised of a corrosion-resistant metal such as stainless steel or titanium. In various embodiments the enclosure is filled with the liquid electrolyte. The liquid electrolyte is a very electrically conductive solution containing positive or negative ions. In the present capacitor cell, any electrolyte solution suitable for use with an electrolytic capacitor may be used. Preferably, the electrolyte contains either a glycerol or glycol, as these render the capacitor cell operative over a much increased temperature range. For example, in certain embodiments, the electrolyte solution contains ethylene glycol or tetraethylene glycol dimethyl ether ("tetraglyme").

Those of skill in the art will recognize that many of the embodiments and techniques provided by the present invention may be used, as applicable, to electrically isolate electrodes of diverse electrochemical cells, such as primary and secondary battery cells. That is, the teaching of the present invention is not to be strictly limited to capacitor cells but should be fairly construed to include other types of electrochemical cells as set forth in the appended claims.

It will be understood by those skilled in the art that there exist many different types and methods for making the anode, the cathode, and the separator layer or envelope. What we disclose herein are only preferred materials, methods and apparatus for making a preferred embodiment of capacitor cell of the present invention, and its various components, and not all the materials, methods and apparatus suitable for practicing the present invention and falling within the scope thereof.

What is claimed is:

1. A substantially flat electrode assembly suitable for use in a capacitor cell, comprising:
    (a) at least one flat cathode layer having no holes for registration disposed therethrough, the cathode layer being formed of cathode foil and having a first perimeter of a first overall length, the cathode layer having at least a first tab projecting from the first perimeter at a first predetermined perimeter location;
    (b) at least one anode member devoid of registration or alignment apertures disposed therethrough; and
    (c) at least one separator envelope comprising upper and lower surfaces formed of separator material, the upper and lower surfaces of the separator envelope substantially surrounding the at least one anode member; wherein at least one surface of separator material is disposed between the at least one cathode layer and the at least one anode member.

2. A flat electrode assembly of claim 1, wherein the cathode layer is formed from aluminum cathode foil.

3. A flat electrode assembly of claim 1, wherein the at least one anode member comprises a pressed, sintered and formed, powdered tantalum metal slug.

4. A flat electrode assembly of claim 1, wherein each anode layer has a specific capacitance selected from the group consisting of at least about 0.3 microfarads/cm$^2$, at least about 0.5 microfarads/cm$^2$, at least about 0.8 microfarads/cm$^2$, at least about 1 microfarads/cm$^2$.

5. A flat electrode assembly of claim 1, wherein said at least one anode member has a thickness of between about 0.5 mm to about 4.0 mm.

6. A flat electrode assembly of claim 1, wherein the cathode layer is formed from a highly etched cathode foil.

7. A flat electrode assembly of claim 1, wherein the cathode layer is formed from a cathodic layer having a specific capacitance selected from the group consisting of at least about 100 microfarads/cm$^2$, at least about 200 microfarads/cm$^2$, at least about 250 microfarads/cm$^2$, and at least about 300 microfarads/cm$^2$.

8. A flat electrode assembly of claim 1, wherein the cathode layer is formed from aluminum foil having a thickness selected from the group consisting of from about 10 micrometers to about 200 micrometers, from about 15 micrometers to about 150 micrometers, from about 20 micrometers to about 100 micrometers, from about 25 micrometers to about 75 micrometers, and about 30 micrometers.

9. A flat electrode assembly of claim 1, wherein the anode sub-assembly comprises a plurality of non-notched anode layers and at least one notched anode layer.

10. A flat electrode assembly of claim 1, wherein the anode layers in the anode sub-assembly are cold-welded together.

* * * * *